United States Patent [19]

Suzuki

[11] Patent Number: 5,296,939
[45] Date of Patent: Mar. 22, 1994

[54] IMAGE AREA DISCRIMINATING SYSTEM FOR AN IMAGE PROCESSING APPARATUS

[75] Inventor: Yuzuru Suzuki, Kanagawa, Japan

[73] Assignee: Fuji Xerox Co., Ltd., Tokyo, Japan

[21] Appl. No.: 637,026

[22] Filed: Jan. 3, 1991

[30] Foreign Application Priority Data

Jan. 10, 1990 [JP] Japan .................................... 2-2940

[51] Int. Cl.⁵ .......................................... A04N 1/387
[52] U.S. Cl. .................... 358/453; 358/462; 358/538
[58] Field of Search .............. 358/456, 453, 462, 75, 358/504, 538

[56] References Cited

U.S. PATENT DOCUMENTS

| | | | |
|---|---|---|---|
| 4,668,995 | 5/1987 | Chen et al. | 358/462 |
| 4,953,013 | 8/1990 | Tsuji et al. | 358/462 |
| 5,016,118 | 5/1991 | Nannichi | 358/456 |
| 5,018,024 | 5/1991 | Tanioka | 358/456 |
| 5,032,904 | 7/1991 | Murai et al. | 358/75 |

Primary Examiner—Edward L. Coles, Sr.
Assistant Examiner—Thomas L. Stoll
Attorney, Agent, or Firm—Finnegan, Henderson Farabow, Garrett & Dunner

[57] ABSTRACT

An image area discriminating system for an image processing apparatus which discriminates between a character area and a halftone area on an original document containing the character and halftone areas, selects parameters for each discriminated area, and adjusts and generates image data. The image area discriminating system comprises: a block color discriminating unit for grouping pixels into blocks and determining block colors on the basis of the formed pixel blocks; a determining unit for detecting the run lengths of block colors other than white, for comparing the detected run lengths with a predetermined threshold value, and for determining whether the document area is the character area or the halftone area; and an area signal output unit for outputting a signal to select an image area signal on the basis of an output signal outputted from the determining unit.

6 Claims, 7 Drawing Sheets

| DETERMINED HUE \ DETERMINING FLAG | r | m | c' | m' | y' |
|---|---|---|---|---|---|
| W | 0 | 0 | 0 | 0 | 0 |
| Y | * | 0 | 0 | 0 | 1 |
| M | * | 0 | 0 | 1 | 0 |
| C | * | 0 | 1 | 0 | 0 |
| B | * | 0 | 1 | 1 | 0 |
| G | * | 0 | 1 | 0 | 1 |
| R | * | 0 | 0 | 1 | 1 |
| K | 0 | 1 | * | * | * |

FIG. 6(c) (PRIOR ART)

| DEVELOPING COLOR \ OUTPUT HUE | W | Y | M | C | B | G | R | K |
|---|---|---|---|---|---|---|---|---|
| y | 0 | 1 | 0 | 0 | 0 | 1 | 1 | 0 |
| m | 0 | 0 | 1 | 0 | 1 | 0 | 1 | 0 |
| c | 0 | 0 | 0 | 1 | 1 | 1 | 0 | 0 |
| k | 0 | 0 | 0 | 0 | 0 | 0 | 0 | 1 |

IMAGE AREA DISCRIMINATING SYSTEM FOR AN IMAGE PROCESSING APPARATUS

BACKGROUND OF THE INVENTION

Background of the Invention

The present invention relates to an image area discriminating system for an image processing apparatus which discriminates between a character area and a halftone area on an original document containing the character and halftone areas, selects parameters for each discriminated area, and adjusts and generates image data.

Description of the Related Art

Generally, a color copying machine reproduces a color image on a full-color original document through four developing processes of Y (yellow), M (magenta), C (cyan), and K (black). In order to store full-color image data that is collected through a one-stroke of image read scan till the four developing processes end, a tremendous amount of memory capacity is required. To avoid this, the original is scanned for one color, the image data is processed, and developed. This sequence of operations is repeated for the four colors.

Figure 4:
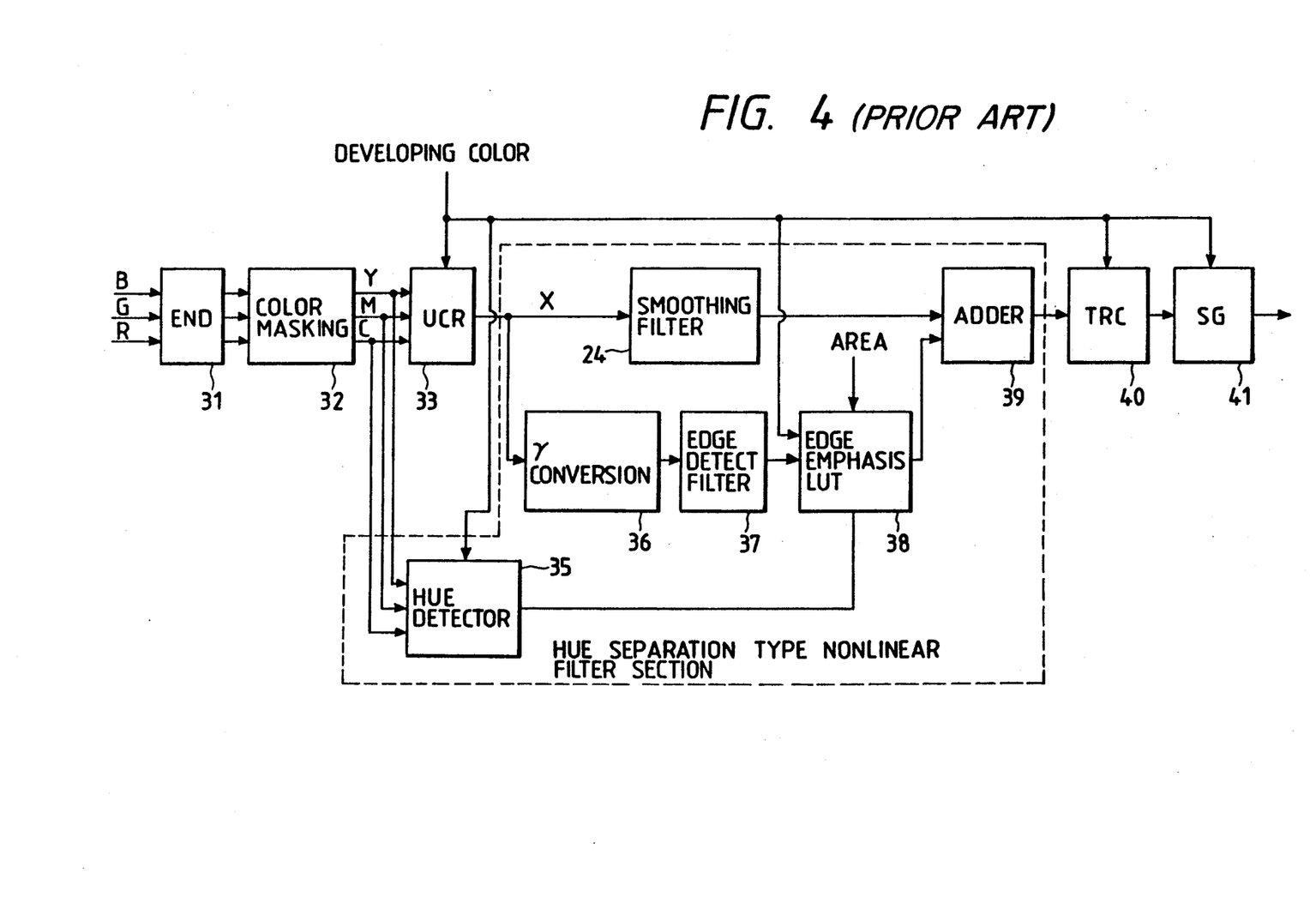
FIG. 4 is a block diagram showing a digital color image processing apparatus.

An image on the original is optically read by using a line sensor, and image data is fetched in the form of separated color signals of colors B (blue), G (green) and R (red). In FIG. 4, the image data is then converted into toner signals of process colors Y, M and C, through an END Equivalent Neutral Density conversion unit 31 and a color masking (color correction) unit 32. A UCR 33 generates black color (K) and removes the under colors. The developing color toner signal X is converted into on/off or two-level data, through a hue separation type nonlinear filter section, TRC (tone reproducing controller) 40, and a SG (screen generator) 41. Under control of the two-level data, a laser beam depicts an image on a charged photoreceptor by a mesh-dot gradation, and the images of the respective colors are superposed one on another, thereby to reproducing the full-color original image.

Usually, in the digital color image processing apparatus, the prescan is followed by the main scan to copy the original image. Through the prescan, the document size is detected and the color original or the black/white original is discriminated. In the main scan, the copying operation is controlled and the processing parameters are selected on the basis of the data collected in the prescan. For example, the full-color output processing is executed for the color original. When the original is the black/white original, the outputting processing of only black is executed. There is an original, document which contains two-level image, such as characters and line picture, and halftone image, such as photograph and mesh-dot printing. For such an original, to have different types of images, a nonlinear filter processing is introduced. Particularly, for forming two-level images of high sharpness, such as characters and line images, there have been proposed many systems for edge emphasis processing. An example of these systems is illustrated in FIG. 4, which is an example of a digital color image processing apparatus with a hue separation type filter section.

Figure 5:
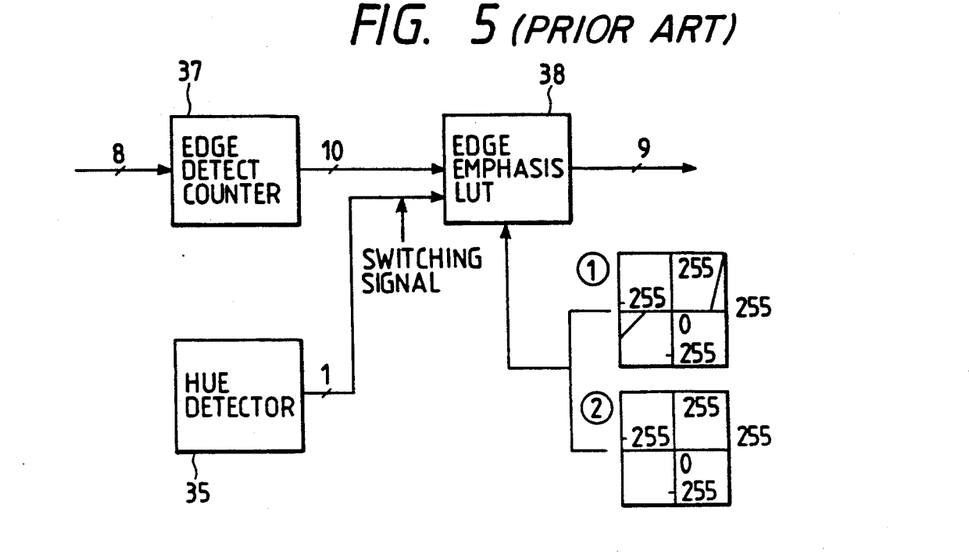
FIG. 5 is a block diagram showing a conventional edge processing circuit.
Figure 6A:
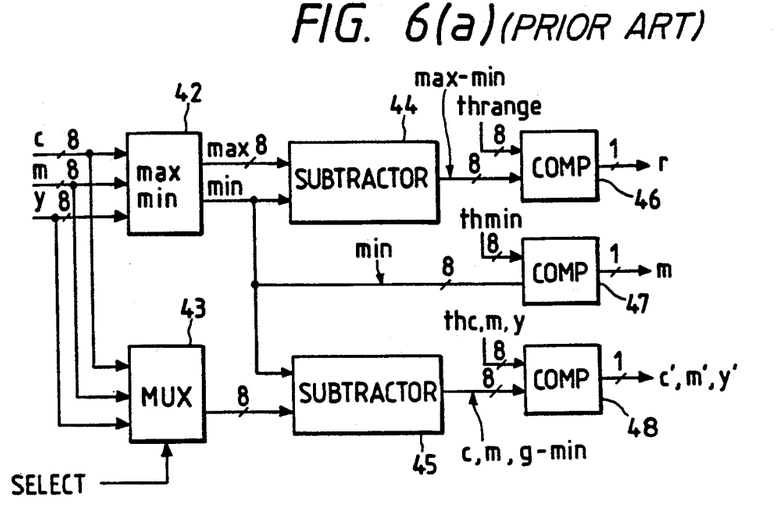
FIGS. 6(a) through 6(c) is a block diagram showing a hue detector.
Figure 6B:
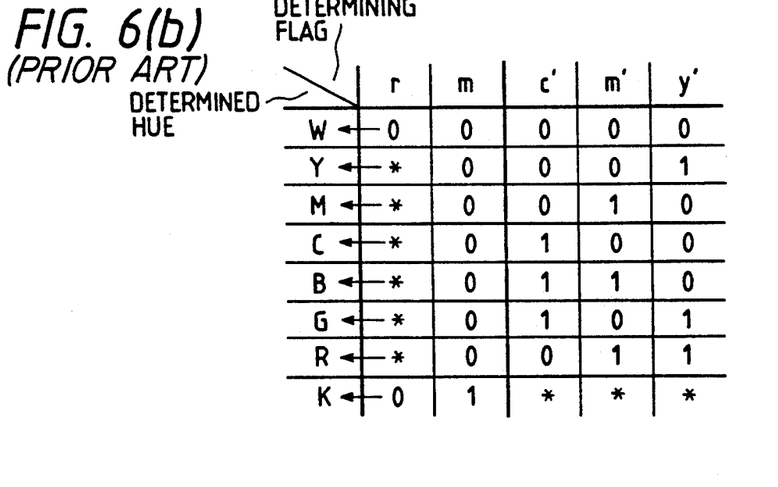
Figure 6C:
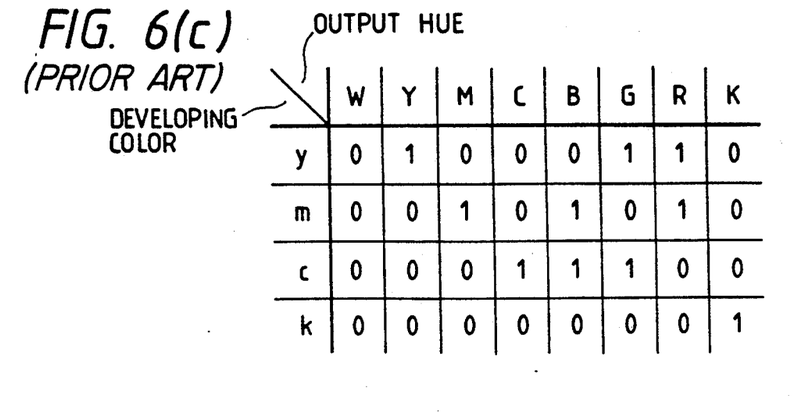

FIG. 4 is a block diagram showing a digital color image processing apparatus. FIG. 5 is a block diagram showing a conventional edge processing circuit. FIG. 6 is a block diagram showing a hue detector.

Developing color image data X, which is selected according to the developing process from among the Y, M, C, and K signals that are formed through the black generation and under color removal processings in the UCR 33, is inputted to the hue separation type nonlinear filter section, and is branched into two signal routes. The data signal on one of the routes is smoothed, while the data signal on the other is edge-emphasized through a γ converter 36, an edge detect filter 37, and an edge emphasis LUT 38. The data signals outputted from those signal routes are added together by an adder 39, and the sum data signal is outputted as a nonlinear filter signal. The edge processing circuit is arranged as shown in FIG. 5, for example.

In the edge processing, a hue detector 35 detects the hue of the image, and determines whether the developing color at that time is necessary or not. If the input image is 9 black area, chromatic signals of Y, M, and C are not edge emphasized, but only the K signal is emphasized according to an edge quantity.

The hue detector 35, as shown in FIG. 6(a), is made up of a max/min circuit 42 for obtaining maximum and minimum values of the colors Y, M and C, a multiplexer 43 for selecting a desired developing color, a subtractor 44 for calculating a difference between the maximum and minimum values, another subtractor 45 for calculating a difference between the minimum value and the developing color, and comparators 46 to 48. The comparators 46 to 48 respectively compare the data with threshold values, and when the former are larger than the latter, output data signals of r, m, c', m', and y' become logic "1". The decision conditions shown in FIG. 6(b) provide determined hues. The necessary/unnecessary color conditions shown in FIG. 6(c) provide necessary developing color "1" or unnecessary developing color "0". In this instance, the determined hue contains eight colors W (white), Y, M, C, B, G, R, and K, as ordinary character colors.

As seen from the necessary/unnecessary color conditions, for the hue B, the developing colors "m" and "c" are necessary, while the remaining colors are not necessary. In this case, accordingly, during the necessary color cycle, the edge is emphasized by data (1) in the edge emphasis LUT 38, while during the unnecessary color cylce, the edge is not emphasized by data (2) in the LUT.

Figure 7A:
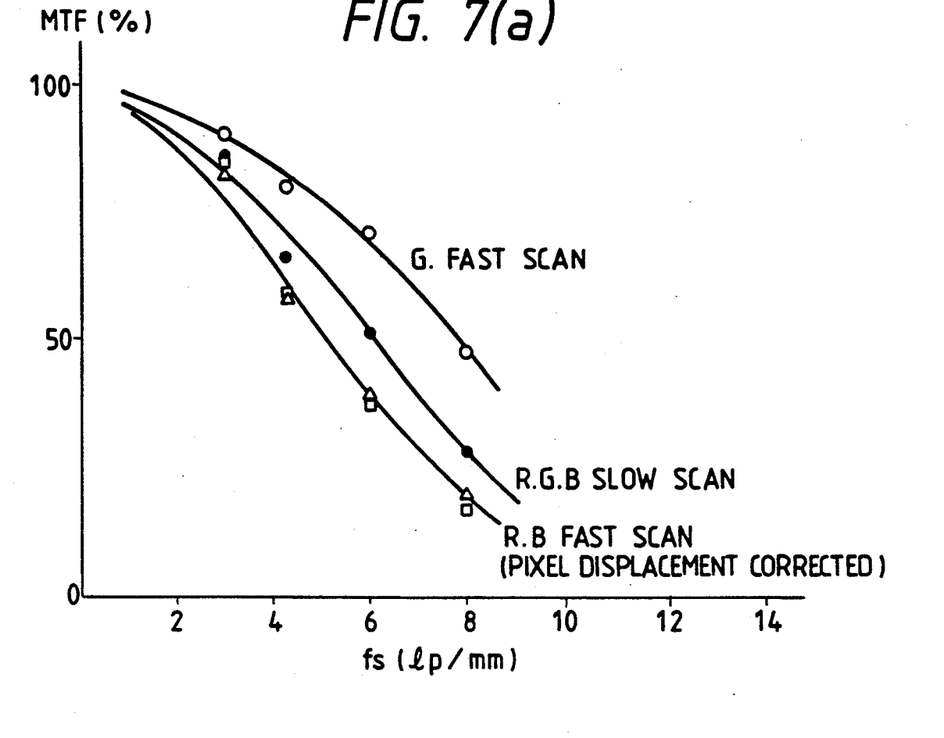
FIGS. 7(a)-7(c) shows diagrams for explaining a character fattening phenomenon.
Figure 7B:
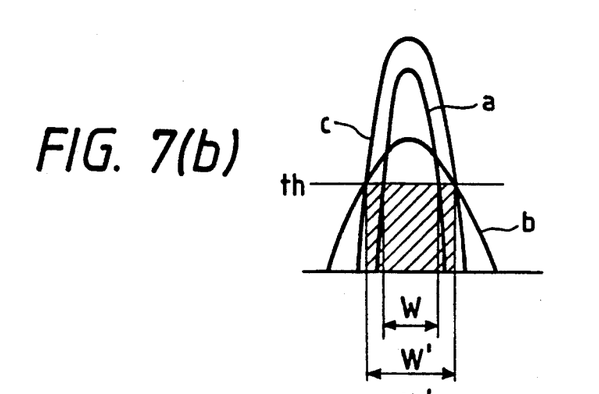
Figure 7C:
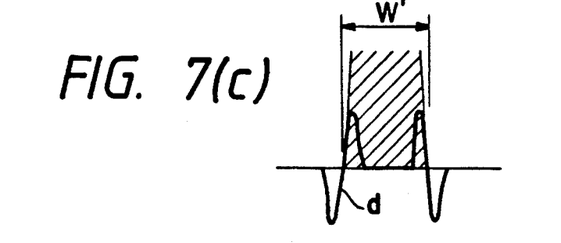
Figures 8A, 8B:
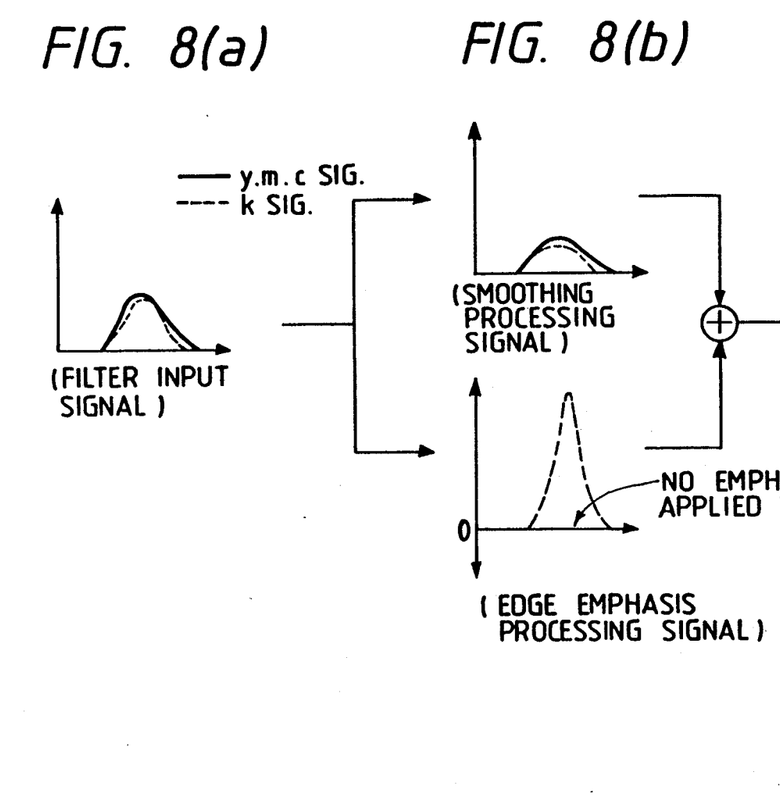
FIGS. 8(a)-8(c) shows graphs for explaining an edge emphasis processing.
Figure 8C:
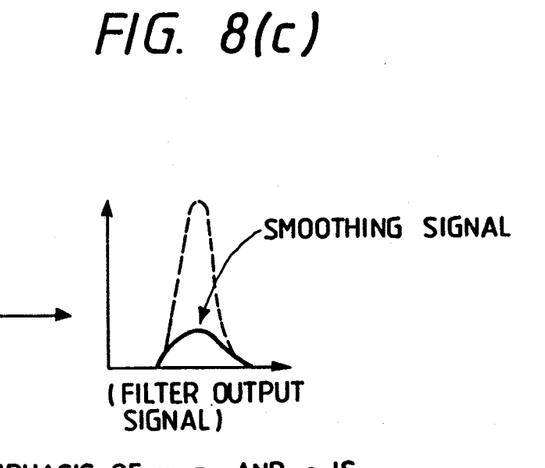

FIG. 7 shows diagrams for explaining a character fattening phenomenon. FIG. 8 shows graphs for explaining an edge emphasis processing.

As described above, in the edge emphasis processing, the hue is discriminated by comparing the data with the threshold value. The edge detect signal is converted by the edge emphasis LUT from the result of the hue discrimination, into an edge emphasis signal. As shown in FIG. 7(a), the MTF (Modulation Transfer Function) characteristic of the IIT (Image Input Terminal) becomes smaller as the frequency becomes high. The degradation of the MTF characteristic also depends on color, and fast and slow scan directions. As the result of the characteristic degradation, a steep waveform "a" in FIG. 7(b), which represents a density distribution of the original document, becomes a flatter waveform "b" in FIG. 7(b). In the hue detection, the signal "b" is compared with the threshold value "th" for determining the hue. Therefore, the width "w" is determined as a broader width "w'" in the hue determination. This broader width determines a range of the edge emphasis. On the basis of the determination, an edge emphasis signal "d" as shown in FIG. 7(c) is added to the data, to emphasize the edge. As a result, the character is reproduced as a fat character "c" in FIG. 7(b). The fattening of the character also arises from the developing material, developing system, developing characteristics, and the like in the IOT (Image Output Terminal).

In the edge emphasizing system as stated above, the black character reproduction is more improved than in other conventional systems in which the Y, M, C, and K signals are all emphasized. However, the smoothed signals remain in the Y, M, and C signals. To be more specific, as shown in the edge emphasis LUT 38 in FIG. 5, the edge emphasis system merely emphasizes the necessary color by the data (1) and removes the unnecessary color by the data (2). Therefore, for the filter input signal of the black character as shown in FIG. 8(a), such an edge emphasis signal is formed as to emphasize only black K, not emphasizing the color signals Y, M and C. In the smoothing filter, the Y, M, and C signals are all smoothed into the signals smoothed as shown in FIG. 8(b). Those signals finally are added together to be Y, M, and C smoothed signals as shown in FIG. 8(c).

The character data of the black character contains Y, M, and C components in addition to black K. Then, the smoothed colors Y, M and C appear in the edge portion. In other words, the reproduced black character contains colors other than black. The reproduced character image is inferior in image quality to the pure black image. For example, the color at the edge changes and becomes impure due to fattened line and lost registration, and hence the sharpness is lost.

In the case of the two-level image, such as characters and line pictures, and the halftone image, such as photographs and mesh-dot printing, the documents or areas bearing such images can be previously designated in an easy manner, and the parameters most suitable for the image can be selected by the image for each document or area. Accordingly, the reproducibility can be improved. In the documents containing different types of images, the parameters of satisfactory level for image reproduction are inevitably selected for both the two-level image and the halftone image. Therefore, neither the two-level image nor the halftone image has the parameters best fit for them. For example, in the two-level image, the edge emphasis is weak and the reproduced character is not clear. In the case of the black character, the edge portion and the character portion are impure in color. In the case of the halftone image, the edge detect frequency and those near it are emphasized, so that the smoothness of the halftone image is impaired and the reproduced image becomes rough with unnatural Moire and unnaturally emphasized edge.

Another image toner discriminating system uses an average value and a standard deviation within a preset pixel block (see Japanese Patent Application Unexamined Publication No. 63-205783). An additional system uses two-level signals resulting from a plurality of dither conversions with different phases (see Japanese Patent Application Unexamined Publication No. 63-193770). Neither of those systems can discriminate between color characters and black characters, and between the character image and the halftone image.

SUMMARY OF THE INVENTION

An object of the present invention is to provide an accurate discrimination between the character area and the halftone area on an original document containing both areas, and the discrimination between the black character and the color character within the character area. Halftone area can readily be discriminated for each block having a plurality of pixels.

A further object of the invention is to enable the color original document and the black/white original to be discriminated readily.

A still further object of the invention is to make it easy to discriminate the image for each block.

The above-mentioned objects are achieved by the provision of an image area discriminating system for an image processing apparatus which in the prescan, discriminates between a character area and a halftone area on an original document containing the character and halftone areas, and selects parameters for each area discriminated in the main scan, and adjusts and generates image data.

The image area discriminating system comprises: block color discriminating means for grouping pixels into blocks and determining block colors on the basis of the formed pixel blocks; determining means for detecting the run lengths of block colors other than white, for comparing the detected run lengths with a preset threshold value, and for determining whether the document area is the character area or the halftone area; and area signal output means for outputting a signal to select an image area signal on the basis of an output signal outputted from the determining means.

Where the run length of a block color except white on the background is present, the character area contains the character on the white background and therefore the run length becomes short. In the halftone area, the run length of the block color is long. Hence, the area can be discriminated by checking the run length.

The block color determining means detects the hue and determines whether or not a maximum density signal of the input image data exceeds a preset threshold value, and finds the color whose appearance frequency is the largest, for block color discrimination. Accordingly, in the area of low density where is not the character area, even if the short run length is detected, it will never be mistakenly recognized as the character area. The blocks whose density exceeds a preset threshold value is recognized as candidates for characters, thereby to discriminate between the color character and the black character.

The determining means includes slow-scan direction edge detect means which checks if an edge is present within several blocks as viewed in the slow scan direction, and discriminates between the character area and the halftone area on the basis of the result of the check. The area signal generating means produces a block color signal when the document area is determined to be the character area, and produces a zero when the area is the halftone area. Accordingly, the horizontal line whose run length is long is recognized as the candidates for characters in the slow scan direction edge detection. Only when the area is the character area, the block color signal of the character is produced.

Additionally, there is provided an image area discriminating system for an image processing apparatus which in the prescan, discriminates between a character area and a halftone area on an original document containing the character and halftone areas, and executes the full-color outputting processing for a color original document, and executes the black-toner developing output processing for a black/white original document, the image area discriminating system comprising: block color discriminating means for grouping pixels into blocks and determining block colors on the basis of the formed pixel blocks; a counter for counting block colors other than white; and determining means for determining whether the document area is a color original document or a black/white original document on the basis of the count of the counter. In this system, the black blocks and other color blocks are counted or only the latter are counted. The count is compared with a preset threshold value. By using the result of the comparison, decision can readily be made whether or not the original document is the color document or the black/white document. The processing suitable for the type of the document that is decided can readily be selected.

DETAILED DESCRIPTION OF THE PREFERRED EMBODIMENTS

Figure 1:
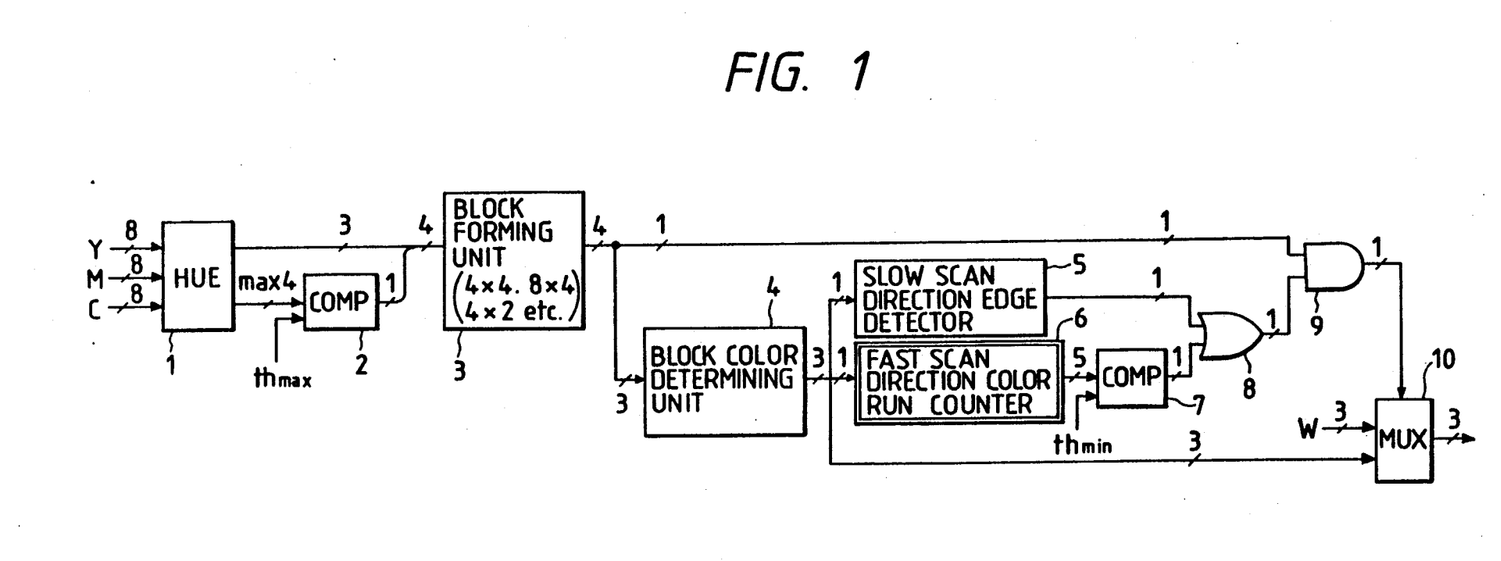
FIG. 1 is a block diagram showing an embodiment of an image area discriminating system for an image processing apparatus according to the present invention.

FIG. 1 is a block diagram showing an embodiment of an image area discriminating system for an image processing apparatus according to the present invention. FIG. 2 shows diagrams for explaining an operation of the circuit shown in FIG. 1.

In FIG. 1, a hue detector 1 detects any of eight hues (Y, M, C, K, W, B, G, and R) for each pixel. A comparator 2 determines whether or not the largest hue of the Y, M and C exceeds the threshold value $th_{max}$. Noise of low density is also detected by the hue detector 1. When it is detected, the run length, to be discussed later, becomes short, so that it is mistakenly recognized as a character area. To cope with this, at least those pixels whose density is higher than a preset value are treated as candidates for the character area (referred to as character candidates). To this end, the comparator 2 compares the largest hue detected with the threshold value $th_{max}$, to remove the noise.

Figure 2A:
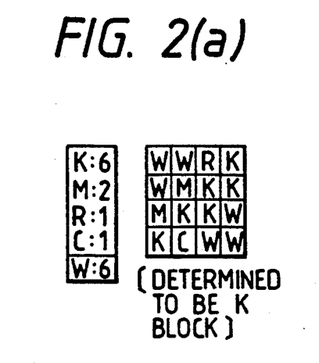
FIGS. 2(a) through 2(d) shows diagrams for explaining an operation of the circuit shown in FIG. 1.

A block forming unit 3 groups the respective pixels into blocks of 4×4 pixels to 8×8 pixels, as shown in FIG. 2(a). In this case, as the block size is larger, a discrimination accuracy of the image area is improved. In this case, however, the number of lines is increased and the hardware scale becomes large. Accordingly, it changes depending on the scan speed on condition that the prescan is used.

A block color determining unit 4 determines a block color for seven colors. To determine the block color, the unit 4 checks the seven colors (Y, M, C, K, B, G, and R) except color W within a block, finds the color appearing most frequently, and determines the color to be the block color. This will be described using a specific example. As shown in FIG. 2(a), 4×4 pixels are treated as one block. A frequency of appearance of each pixel is counted. The result of the counting is: K=6, M=2, R=1, C=1, and W=6. Of those pixels of black and colors other than white, the color of the pixel whose frequency is the largest is determined to be the block color. In this case, it is K, and the block color is K. Where the block color is obtained in this way, a run length in a mesh-dot area, where when the run length is set up for each pixel, the run length becomes short and it is difficult to discriminate it from the character area, becomes long, as shown in FIG. 2(d). In the character area, a space between adjacent characters is longer than the mesh-dot pitch. Accordingly, the block run length becomes short. Thus, when the block run length is employed, the image area can be discriminated from the character area.

A fast scan direction color-run counter 6 receives, from the determining unit 4, one bit indicative of W (0) or color black (1), and counts the run length of the color/black block in the fast scan. A comparator 7 is provided for determining whether or not a count (run length) of each block is shorter than a threshold value $th_{run}$ as shown in FIG. 2(c). In this instance, when the run length of the color/black block is shorter than an threshold value $th_{run}$, it becomes the character candidate.

Figure 2B:
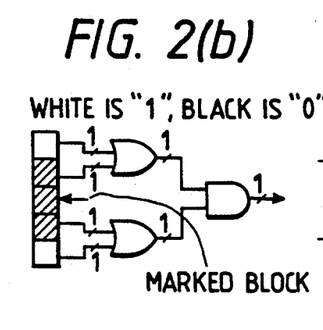
Figure 2C:
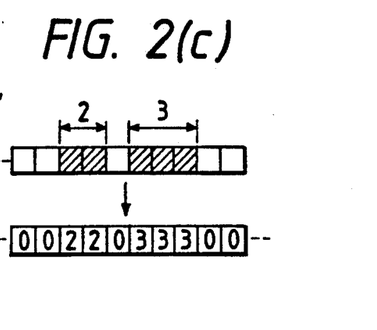
Figure 2D:
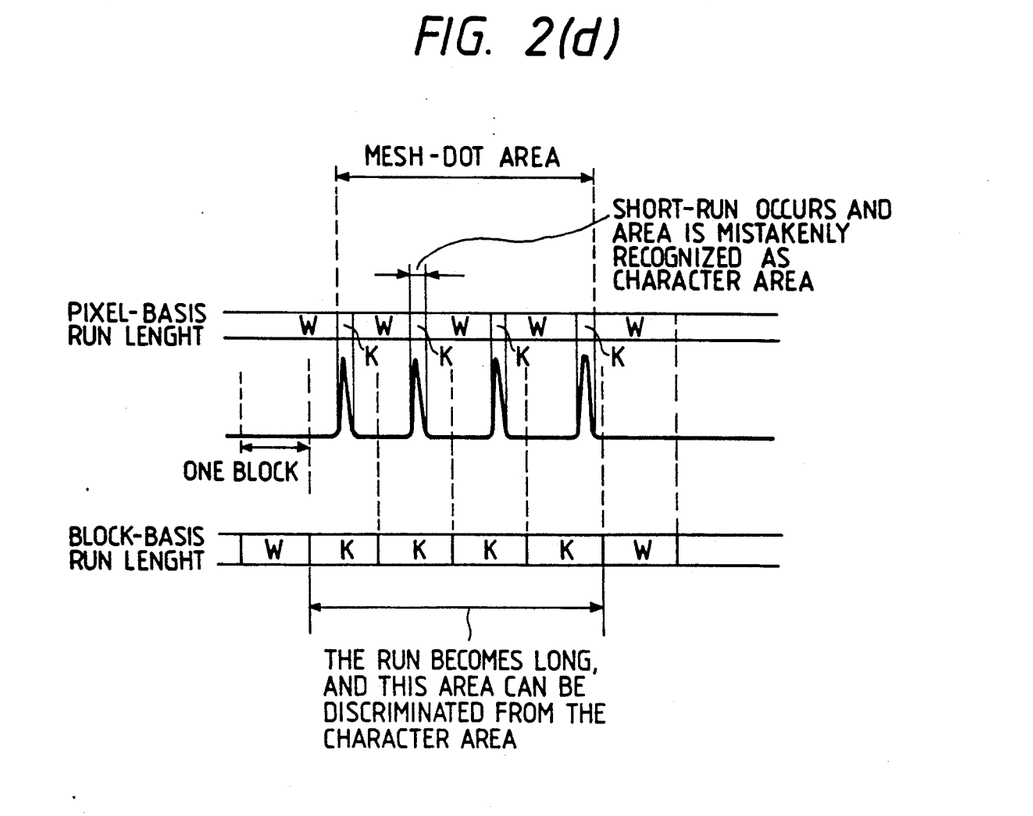

A slow scan direction edge detector 5 is for determining whether or not an edge is present within a range of several blocks in the slow scan direction as shown in FIG. 2(b). If the edge is present, the pixel is determined to be the character candidate. The reason for this is that since a horizontal line used in the character area also provides a long run length, it will not be the character candidate in the case of the first scan run length, and also in such a case, however, those blocks must be detected as the character candidates. In a case where five blocks, for example, are selected in the slow scan direction and if white blocks are present on both sides of a marked block, it is treated as the character candidate.

When the detection result shows that the character candidate is present in either the fast or slow scan and the max flag of the block is "1", an OR gate 8 and an AND gate 9 cooperate to determine this block to be the character area, and output a block color signal that is determined by the block color determining unit 4. Here, the max flag indicates that the block contains at least one pixel which is the largest one of the hues Y, M and C and exceeds the threshold value $th_{max}$ as the result of the determination by the comparator 2.

As described above, the present invention is based on the fact that the run length around the character area is short. More specifically, the character area has clusters of character blocks and clusters of background, and lies in the texture background. Accordingly, in the character area, density varies sharply. On the other hand, the image area lies in the image background, and in this area, density varies gradually. Therefore, the run length is short in the character area, and is long in the halftone area. The pixel-basis run length is hard to distinguish the mesh-dot area from the character area. In the mesh-dot run length, when the pixels are grouped into blocks, the run length becomes long. Therefore, it can be recognized in the halftone area, not in the character area. That is, by grouping the pixels into blocks, the mesh-dot patch portion of high frequency tends to occur in the form of the color block with the long run length, and hence, it can be fetched into the system as the halftone area. The mere detection of the character candidate by the fast direction color-run counter 6 and the comparator 7 mistakenly recognizes the line whose run length is long in the fast scan direction. To avoid this, when the slow scan direction edge detector 5 detects an edge, it is treated as the character candidate.

Description to follow is details of another embodiment of the present invention which can automatically select the operation according to a color document or a black/white document with a high precision on the basis of the technique that the pixels are grouped into blocks and the block color is determined.

Figure 3A:
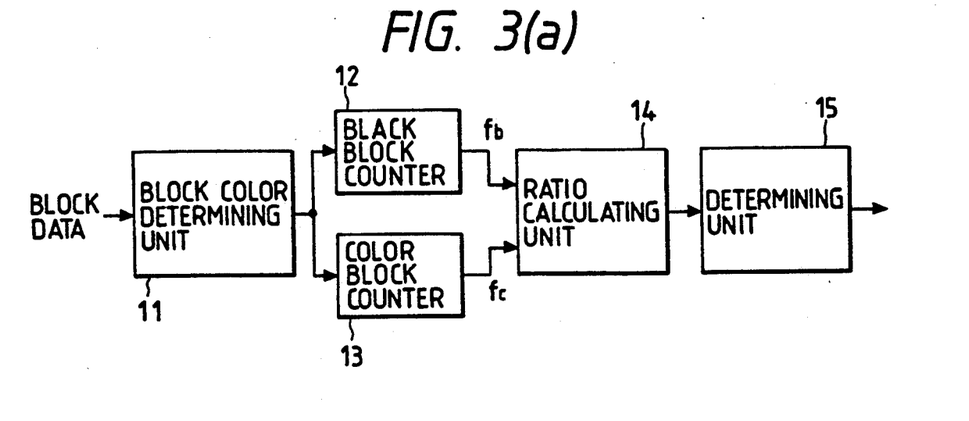
FIGS. 3(a) and 3(b) is a block diagram showing another embodiment of the invention based on the block color determination technique of the invention.
Figure 3B:
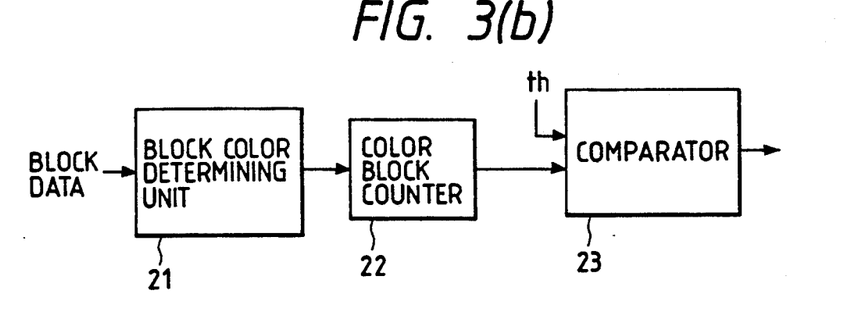

FIG. 3 is a block diagram showing another embodiment of the invention based on the block color determination technique of the invention.

In FIG. 3(a), a black block counter 12 counts the number of black blocks that is determined by the block color determining unit 11. A color black counter 13 counts the number of blocks of colors other than W of the background and K of black. A ratio calculating unit 14 calculates a ratio (fc/fb) of count fb of the black block counter 12 and count fc of the color block counter 13. A determining unit 15 determines whether or not the calculated ratio exceeds a preset threshold value, and recognizes the document as a color document or a black/white document on the basis of the result of the determination. With such an arrangement, the color document and the black/white document can be determined. Accordingly, the prescan is executed to make this determination. The signal from the determining unit 15 is used in the main scan, and in the case of the full color document, the processing for outputting full colors is performed. In the case of the black/white document, the processing for outputting the K-developed image is performed. Alternatively, the image area discriminating system may be arranged as shown in FIG. 3(b), in which the black block counter is omitted, and only the color block counter is used. In the alternative, the color blocks are counted by using the color block counter 22. The count outputted from the comparator 23 is compared with the threshold value "th". The color original or the black/white document is recognized through the comparison.

It is evident that the present invention is not limited to the above-mentioned embodiments, but may variously be changed and modified within the scope of the invention. Chromaticity signals, such as a*, b*, and IQ, may substitute for the color signals of Y, M, and C, for the hue detection. In the embodiment, to obtain the block color, hue is determined for every pixel. If required, however, the block color may be obtained after it is averaged for every pixel. In the prior technique, since the color is determined for every pixel, when a black character original document is read by an image reader or a sensor, and color is recognized, error tends to occur in the color discrimination. Particularly at the edge of the character, it occurs more frequently. As accumulation of the errors progresses, a black character original document sometimes is mistakenly recognized as a color original document. The block color determination of the invention is remarkably efficacious against the problem. Furthermore, if some line buffers are used, color recognition can be made simultaneously with the main scan, without the prescan.

As seen from the foregoing description, the image area discriminating system of the invention groups the pixels into blocks, and determines block colors. Accordingly, the characters, mesh dots and halftone can be discriminated by using the run length thereof. Further, the image area discriminating system can discriminate between the color original and the black/white original. Accordingly, when applied to an original document having both the character area and the halftone area, the system can accurately discriminate between the areas, through the prescan. The two-level image and the halftone image can both be improved in their reproduction by merely selecting parameters in conformity with the areas, not designating the areas. In the character area, it is possible to discriminate between a color character and a black character on the basis of the block color. This implies that if the color character is properly processed, a clean and sharp character can be reproduced. With some additional circuits, the color original or the black/white original can be recognized, so that for the recognized original, the processing suitable for the original may be applied. Therefore, the unnecessary operations in handling the black/white original documents can be removed. Additionally, the hardware to discriminate the image areas is simple in construction but is able to make the discrimination with high precision.

What is claimed is:

1. An image area discriminating system for an image processing apparatus for discriminating between a character area and a halftone area on an original document containing characters and halftone areas, for selecting parameters for each discriminated area, and for adjusting and generating image data, said image area discriminating system comprising:
   block color discriminating means for grouping a plurality of multicolor pixels into blocks and determining a color of each block by selecting one pixel color most frequently occuring in the block;
   determining means for detecting block run lengths of block colors other than white according to results of said block color discriminating means, for comparing said detected block run lengths with a predetermined threshold value, and for determining whether a document area being examined is one of the character area and the halftone area; and
   area signal output means for outputting a signal to select an image area signal according to results determined from said determining means.

2. The image area discriminating system according to claim 1, wherein said determining means determines the document area during a prescan to alter processing parameters according to results of a determination performed during a fast scan.

3. The image area discriminating system according to claim 1, wherein said determining means includes slow-scan direction edge detect means for checking whether an edge is present within a predetermined number of blocks as viewed in the slow-scan direction, and discriminates between the character area and the halftone area on basis of the result from said slow-scan direction edge detect means.

4. The image area discriminating system according to claim 1, wherein said area signal output means produces a block color signal when the document area is determined to be the character area.

5. An image area discriminating system for an image processing apparatus for discriminating between a character original document and a halftone original document, and for executing full-color output processing for a color original document and black-toner developing output processing for a black and white original document during a main scan, said image area discriminating system comprising:

block color discriminating means for grouping a plurality of multicolor pixels into blocks and determining a color of each block by selecting one pixel color most frequently occuring in the block;

counter means for counting frequency of appearances of block colors; and determining means, responsive to the frequency of appearances of block colors from said counter means, for determining whether a document area being examined is a color original document or a black and white original document.

6. The image area discriminating system according to claim 5, wherein said image processing apparatus discriminates between the character original document and the halftone original document during a prescan.

* * * * *